March 5, 1957
M. WEINBERGER
2,783,798
SAW TOOL
Filed Nov. 8, 1955
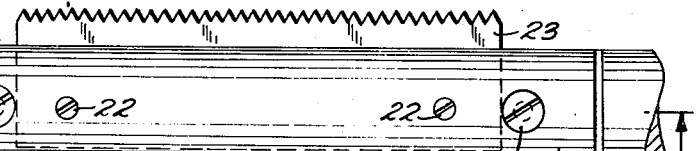
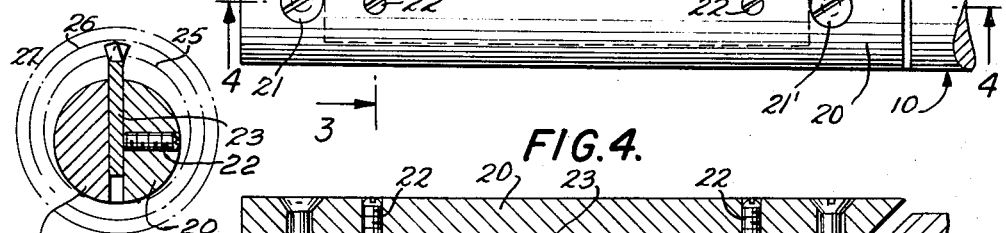
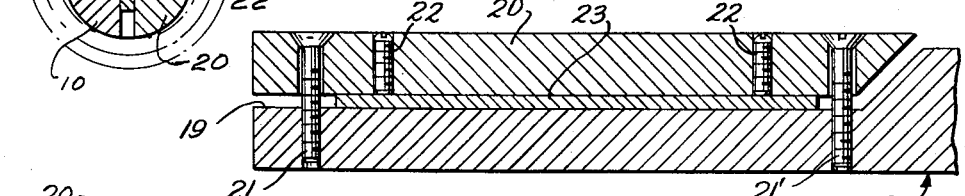
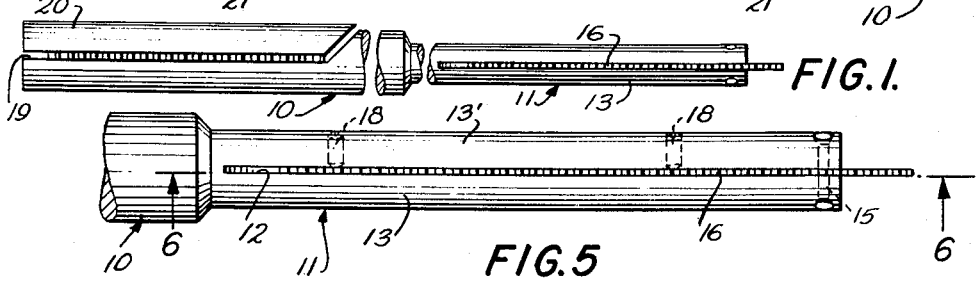
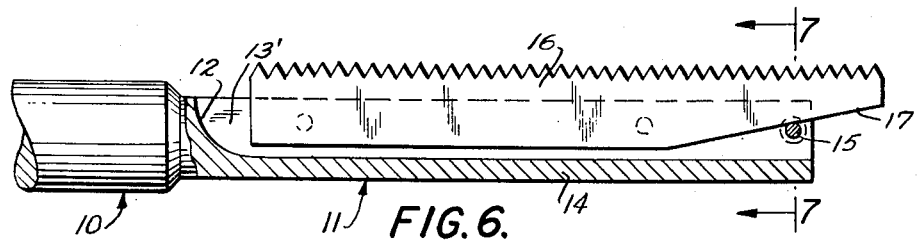
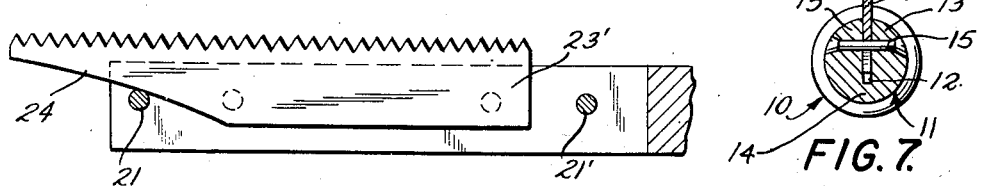
INVENTOR.
MORRIS WEINBERGER
BY
ATTORNEY

United States Patent Office 2,783,798
Patented Mar. 5, 1957

2,783,798

SAW TOOL

Morris Weinberger, New York, N. Y.

Application November 8, 1955, Serial No. 545,728

3 Claims. (Cl. 145—31)

This invention relates broadly to tools and particularly to saw tools adapted for use in removing corroded, broken-off or otherwise deteriorated plumbing components which resist removal by the usual plumbers' tools, such as a pipe wrench.

In the plumbing trade it very often occurs that either a pipe fitting, such as an elbow, a T, a bushing or a nipple is so damaged by corrosion or use that its replacement by a sound fitting becomes difficult. It also very often occurs that a pipe or nipple is broken off close to the thread holding it. The removal of a corroded pipe fitting or nipple must be done so that the thread by means of which it is attached should not be damaged so that a sound replacement part can be connected to the thread. It is the usual practice in the plumbing trade to saw either a defective fitting or nipple in one or several places, whereupon it is removed in sections. In this operation it very often happens that the sound holding thread is damaged since there is no possibility of gaging the depth of a cut by a saw.

The prime object of the present invention is the provision of a simple, practical and inexpensive saw tool which facilitates the adjustment of a saw blade to a desired depth so that the thread holding the defective part to be removed is not damaged; in other words, the saw blade is set to cut through the body of the part only.

Another object of this invention is the provision of a handy, easily operable and readily adjustable saw tool in the form of an elongated, one-piece bar, composed of two bar portions of differently sized cross sections, one being of a larger cross section than the other, and wherein the portion of the smaller cross section is slotted longitudinally to divide that portion into two like sections connected along one of their edges, and wherein the free ends of the sections are kept against spreading by means of a fixed connector, and wherein in the slot between the two sections there is placed a saw blade which can be adjusted as to its depth within the slot by means of that connector, and wherein in one section there are provided set screws for holding the blade in adjusted position, and wherein the bar part of the larger cross section is offset to substantially half its thickness, the offset portion serving for accommodating a component member which is secured to the offset bar portion by means of adjustable connectors, the space between that component and the offset bar portion facilitating the placing thereinto of a saw blade, and wherein set screws are provided either in that offset bar portion or in said component for holding the saw blade in position; and wherein at least one of the adjustable connectors in the larger bar portion preferably serves as blade-positioning means; and wherein either end of the bar can be used as handle when only one saw blade is employed.

The foregoing and still further objects and advantages of the present invention will become more fully apparent in the following description in connection with the accompanying drawings, wherein:

Fig. 1 is a plan view of the preferred form of the device disclosing a one-piece saw-holding bar forming two portions of different thicknesses;

Fig. 2 is an enlarged side elevation of the larger bar portion;

Fig. 3 is a section taken approximately along lines 3—3 of Fig. 2 and indicating in broken lines a pipe nipple to be removed;

Fig. 4 is a section taken along lines 4—4 of Fig. 2;

Fig. 5 is a plan view of the thinner bar portion;

Fig. 6 is a longitudinal cross section taken approximately along lines 6—6 of Fig. 5;

Fig. 7 is a section taken approximately along lines 7—7 of Fig. 6; and

Fig. 8 is a fragmental side elevation of the larger bar portion, partly in section, illustrating a saw blade in adjusted position, the saw-holding component being omitted.

As shown in Fig. 1 the device comprises a continuous, one-piece bar composed of two portions of different body dimensions, one being of a larger cross section than the other. The portion of the larger cross section is indicated at 10, the portion of the smaller cross section being denoted at 11. That smaller bar portion is shown to be provided with a longitudinal slot 12 which divides that bar portion into two like sections 13, 13' which are connected with one another along one of their longitudinal edges 14. At the free end of sections 13, 13' there is provided a fixed connector 15 which serves two purposes. In the first place it holds the two sections against spreading, and, secondly, it provides an adjusting stop for blade 16, the back of which latter is preferably tapered as at 17, see Fig. 6.

In one of the sections, for instance in section 13', there are provided set screws 18 by means of which blade 16 is held in adjusted position within the slot. Through the cooperation of tapered back 17 of the blade and fixed connector 15 the blade can be readily set to the desired depth, and upon that adjustment the set screws 18 are tightened.

The larger portion 10 of the tool is offset as shown at 19 along substantially the longitudinal center plane passing through the tool, see Figs. 3 and 4, and cooperating with the offset is an adjustable component in the form of a clamping bar 20 which is held in place by adjustable connectors 21 and 21'. Component bar 20 is shown to have set screws 22 for holding blade 23 placed into the space between the offset in bar portion 10 and the clamping bar.

In the modified form of the blade shown in Fig. 8 the blade 23' is shaped similarly to blade 16 of Fig. 6 in that the back of the blade is tapered as at 24 so that the outer connector 21 serves for adjusting the depth of the blade between bar portion 10 and clamping bar 20.

*Application and use of the device*

As will be seen in the drawings, slot 12 in saw-holding bar portion 11 is rather narrow and is intended for the reception of a piece of an ordinary thin saw blade, whereas larger bar portion 10 is adapted to receive saw blades of heavier gages.

As has been stated previously it is important that when a nipple or a pipe fitting is to be removed by way of sawing through its body, it is essential that the holding thread for such nipple or pipe fitting remains undamaged. For this reason the saw blade at either end of the tool is made adjustable as to its depth.

In Fig. 3 the larger end of the saw tool is shown inserted into a nipple to be removed, the interior diameter of which nipple being indicated at 25, the base of the thread being denoted at 26 and the outer circumference of the thread is shown at 27. Saw blade 23 is shown to extend into the nipple body but short of thread base 26. In consequence of such adjustment the thread holding the nipple will not be damaged. When the tool is thus adjusted, a single cut through the nipple body is usually sufficient for collapsing and removing the nipple. If necessary, two such body cuts man be made to facilitate an easier removal of the nipple.

A similar procedure is followed when a fitting is to be removed, such as an elbow from a pipe. In that case the blade is so adjusted that it will cut through the body of the elbow only, but the saw blade will not touch the base of the thread of the pipe to which the elbow is attached. By making one or two such cuts through the body of the fitting the removal is greatly facilitated and the thread of the holding pipe can now receive a replacement fitting.

As explained in the foregoing, the present tool is a one-piece bar comprising two portions, one having large, the other having a smaller cross section. The portion of the smaller cross section is adapted to receive relatively thin hack saw blades, whereas the portion of the large cross section is adapted to receive heavier gage blades. Thus the tool can be used for pipes of relatively small diameters, such as a standard one-half, three-quarter and one inch pipe, whereas the larger end is employed for cutting large pipes and fittings. It is preferred to use but one end of the tool for sawing, while its other end serves as handle.

While the present tool is primarily adapted for use in the plumbing trade, it may also be used as sawing instrument in many other fields, since obviously hack saw blades can be replaced by other types of saws, such as compass, wood cutting, and many other kinds of saws. Thus the tool can be used for sawing any desired material, and due to the fact that the depth of the cut can be regulated by the setting of the saw, the advantage of the tool is readily apparent.

While in the drawings a specific form of the device is shown, requirements for special uses of the tool may call for obvious modifications, such modifications being deemed to reside within the scope of the present invention as defined in the annexed claims.

What is claimed as new is:

1. In a saw tool, an elongated tool body composed of two integral, continuous members of differently sized cross sections, at least one of the members having saw-receiving means extending longitudinally along said member, at least one connector passing through said saw-receiving means, a saw blade having a tapered back portion placed into said saw-receiving means so that its tapered back portion rests against said connector, said saw blade being adjustable lengthwise within said saw-receiving means while its tapered back portion remains in contact with said connector, whereby a depth adjustment of the blade in respect to said saw-receiving means is effected, and set screws in said member for holding the saw blade in its adjusted position.

2. In a saw tool according to claim 1, and wherein the saw-receiving means constitutes a slot extending axially to the free end of said member and being of a depth substantially less than the body thickness of said member, said slot dividing said member into two connected body portions, said connector in said member being located at the free end of and passing through both said body portions and preventing them from spreading, said set screws being located in one of the body portions.

3. In a saw tool according to claim 1, and wherein said saw-receiving means comprise two spaced components of substantially semi-circular cross sections, a pair of connectors for the two components, the tapered back portion of said saw blade resting against one of the connectors, said set screws being located in one of the components.

References Cited in the file of this patent

UNITED STATES PATENTS

| | | |
|---|---|---|
| 148,136 | Parmele | Mar. 3, 1874 |
| 316,753 | Delafield | Apr. 28, 1885 |
| 1,438,645 | Hill | Dec. 12, 1922 |
| 1,735,998 | Elkin | Nov. 19, 1929 |
| 1,872,939 | Haddican | Aug. 23, 1932 |
| 2,406,160 | Otteson | Aug. 20, 1946 |